United States Patent [19]

Angermann et al.

[11] Patent Number: 5,409,087
[45] Date of Patent: Apr. 25, 1995

[54] HYDRAULIC DASHPOT FOR MOTOR VEHICLES

[75] Inventors: Rolf Angermann, Ennepetal; Reinhard Hölscher, Salzkotten; Volker Hansemann, Ennepetal, Berthold Kolz, Gusenburg, Walter Theobald, Weiskirchen, Friedrich Wiegand, Waldrach, all of Germany

[73] Assignee: August Bilstein GmbH & Co. KG, Ennepetal, Germany

[21] Appl. No.: 253,408

[22] Filed: Jun. 3, 1994

Related U.S. Application Data

[63] Continuation-in-part of Ser. No. 46,213, Apr. 9, 1993, abandoned.

[30] Foreign Application Priority Data

Apr. 11, 1992 [DE] Germany .......... 42 12 228.7

[51] Int. Cl.⁶ .............. F16F 9/48; F16F 5/00
[52] U.S. Cl. .................. 188/284; 188/288; 188/317
[58] Field of Search ........... 188/281, 284, 288, 315, 188/316, 322.15, 322.17, 322.19, 317

[56] References Cited

U.S. PATENT DOCUMENTS

| | | | |
|---|---|---|---|
| 2,606,630 | 8/1952 | Rossman | 188/284 |
| 3,378,110 | 4/1968 | Parrish, Jr. | 188/315 |
| 3,447,644 | 6/1969 | Duckett | 188/288 |
| 3,598,205 | 8/1971 | Kenyon | 188/284 X |
| 4,230,309 | 10/1980 | Schnitzius | 188/284 X |

FOREIGN PATENT DOCUMENTS

| | | | |
|---|---|---|---|
| 24239 | 12/1921 | France | 188/288 |
| 38475 | 3/1979 | Japan | 188/316 |

Primary Examiner—Robert J. Oberleitner
Assistant Examiner—Kevin D. Rutherford
Attorney, Agent, or Firm—Max Fogiel

[57] ABSTRACT

A hydraulic dashpot for motor vehicles. It has a cylinder that accommodates a fluid. A shock-absorbing piston travels back and forth in the cylinder and divides it into two displacement chambers. The piston is connected to a rod that extends through a centering component at one end of the cylinder. A hydraulic decompression-stroke limiter consists of a cup-shaped recess below the rod-centering component and of another piston on the piston rod above the shock-absorbing piston. Channels extend through the stroke-limiting piston and are blocked off in the decompression-stroke direction. The object is a less expensive dashpot. The stroke-limiting piston consists of a thin stroke-limiting disk with a diameter slightly shorter than the critical diameter of the recess and resting on a thicker support.

9 Claims, 5 Drawing Sheets

HYDRAULIC DASHPOT FOR MOTOR VEHICLES

BACKGROUND OF THE INVENTION

The present application is a continuation-in-part of the parent application Ser. No. 08/046,213, filed Apr. 9, 1993, now abandoned.

The present invention concerns a hydraulic dashpot for motor vehicles. It has a cylinder that accommodates a fluid. A shock-absorbing piston travels back and forth in the cylinder and divides it into two displacement chambers. The piston is connected to a rod that extends through a centering component at one end of the cylinder. A hydraulic decompression-stroke limiter consists of a cup-shaped recess below the rod-centering component and of another piston on the piston rod above the shock-absorbing piston. Channels extend through the stroke-limiting piston and are blocked off in the decompression-stroke direction.

The hydraulic decompression-stroke limiters employed in motor vehicles limit the wheel spring-out that maintains a smooth ride when a vehicle travels over a bumpy road for example by increasing the attenuating forces at the end of the decompression stage to an extent that depends on the spring-out.

Known hydraulic decompression-stroke limiters essentially comprise a recess integrated into the piston-rod centering component and a stroke-limiting piston turned in one piece on a lathe and with a diameter slightly shorter than the critical diameter of the recess (Reimpell/Stoll Fahrwerktechnik: Stoss- und Schwingungsdämpfer, Würzburg, Vogel-Buchverlag). Oil is forced through the gap left between the piston and the inner wall of the recess. A throttling action ensures and allows the decompression forces to increase at the end of the stroke.

Since the attainable level of decompression forces depends on the cross-section of the gap, the stroke-limiting piston and recess must be manufactured to very precise tolerances, which makes them very expensive.

SUMMARY OF THE INVENTION

The object of the present invention is an inexpensive hydraulic stroke limiter for dashpot with a very precisely dimensioned gap between the stroke-limiting piston and the recess.

The stroke-limiting piston in accordance with the invention consists of a thin disk with a diameter slightly shorter than the critical diameter of the recess and resting on a thicker support. The cross-section of the gap for the residual oil is determined only by the thin stroke-limiting disk.

The one-way valves that block off the channels in the decompression-stroke direction in one embodiment of the stroke-limiting piston extend between the stroke-limiting disk and its support. It is, however, also possible for the valves, and preferably at least a spring-loaded disk, to be mounted on the disk.

The recess for the stroke-limiting piston is comprised of a tubular component below the piston-rod centering component. The inner surface of the tubular component deviates slightly from the round in order to produce a specific attenuating force at the end of the stroke as a function of wheel spring-out. The end of the tubular component facing the stroke-limiting piston in one advantageous embodiment is beveled for example to prevent the attenuating force from increasing too rapidly and to ensure that auxiliary attenuation will ensure gradually. Another way of varying the attenuating force is to include two-stroke-limiting disks, each with its own channels extending through it, in the stroke-limiting piston. This design will vary the height of the gap and control the attenuating force.

The advantage of the decompression-stroke limiter in accordance with the invention is that only the circumference of the stroke-limiting disk needs to be manufactured to precise tolerance in order to shape the attenuation at the end of the stroke as desired. Since the disk can be a simple stamping for example, no expensive further machining will be necessary.

The present invention, furthermore, provides that the force becomes larger when the stroke limiting disk moves in the decompression-stroke direction and the distance between the end points of the piston path increases. The damping force, on the other hand, becomes reduced through opening of the one-way valves in the channels during a compression stroke.

Accordingly, the present invention provides for a reverse function or operation which is entirely opposite to what is known in the art. This reverse function does not result from a mere kinematic reversal of motions or movement of parts. Instead, this reverse operation of the present invention results through a different construction of the damper from that known in the art.

The present invention, moreover, provides for an additional stroke-limiting piston or an additional stroke-limiting disk which consists of a highly precisely fabricated abutting part and a supporting part.

BRIEF DESCRIPTION OF THE DRAWINGS

Several embodiments of the invention will be specified by way of example with reference to the drawing, wherein.

DESCRIPTION OF THE PREFERRED EMBODIMENTS

Figure 1:
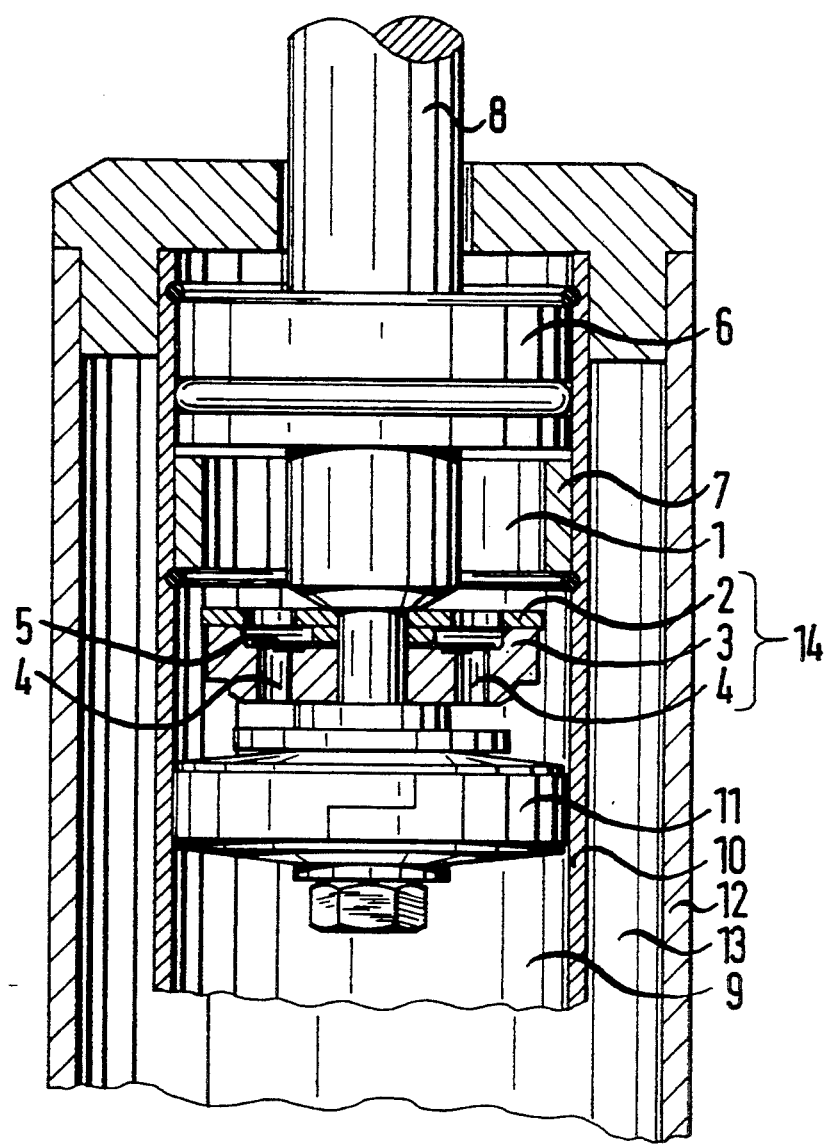
FIG. 1 is a section through a two-cylinder dashpot with one-way valves between the stroke-limiting dish and its support.

The two-cylinder dashpot illustrated in FIG. 1 has a displacement chamber 9 demarcated by a cylinder 10 and at the top by a piston-rod centering component 6 and at the bottom by an unillustrated valve. A shock-absorbing piston 11 travels back and forth in displacement chamber 9. A piston rod 8 extends through centering component 6 from shock-absorbing piston 11. Cylinder 10 is accommodated in an outer cylinder 12. Between the two cylinders is an equalization compartment 13. Equalization compartment 13 is half and displacement chamber 9 completely filled of fluid.

Figure 3A:
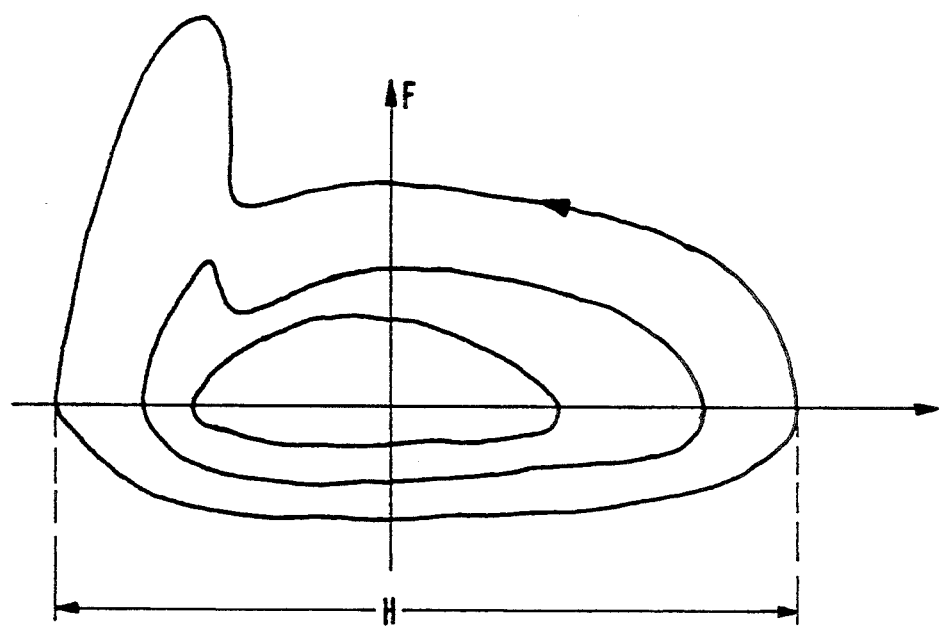
FIG. 3a is a graph of attenuating force.

Mounted below centering component 6 and on the inner wall of the cylinder 10, is a hydraulic stroke limiter consisting of a tubular component 7 that demarcates a recess 1 and of a stroke-limiting piston 14. Stroke-limiting piston 14 comprises a thin stroke-limiting disk 2 resting on a support 3. The diameter of stroke-limiting disk 2 is slightly shorter than the critical diameter of recess 1. Stroke-limiting disk 2 demarcates the gap for the residual oil between the inner surface of tubular component 7 and stroke-limiting piston 14 and must accordingly be precisely dimensioned. Since the only function of support 3 is to support stroke-limiting disk 2, its tolerance is not important. Stroke-limiting piston 14 also has channels 4 extending through it. Channels 4 are blocked off in the decompression-stroke direction by at least one spring-loaded disk 5. The spring-loaded disk in this embodiment is between stroke-limiting disk 2 and its support 3. The associated graph of attenuating force F per stroke H is illustrated in FIG. 3a. The attenuating force increases relatively steeply as the hydraulic stroke limiter enters operation at the end of the stroke.

Figure 2:
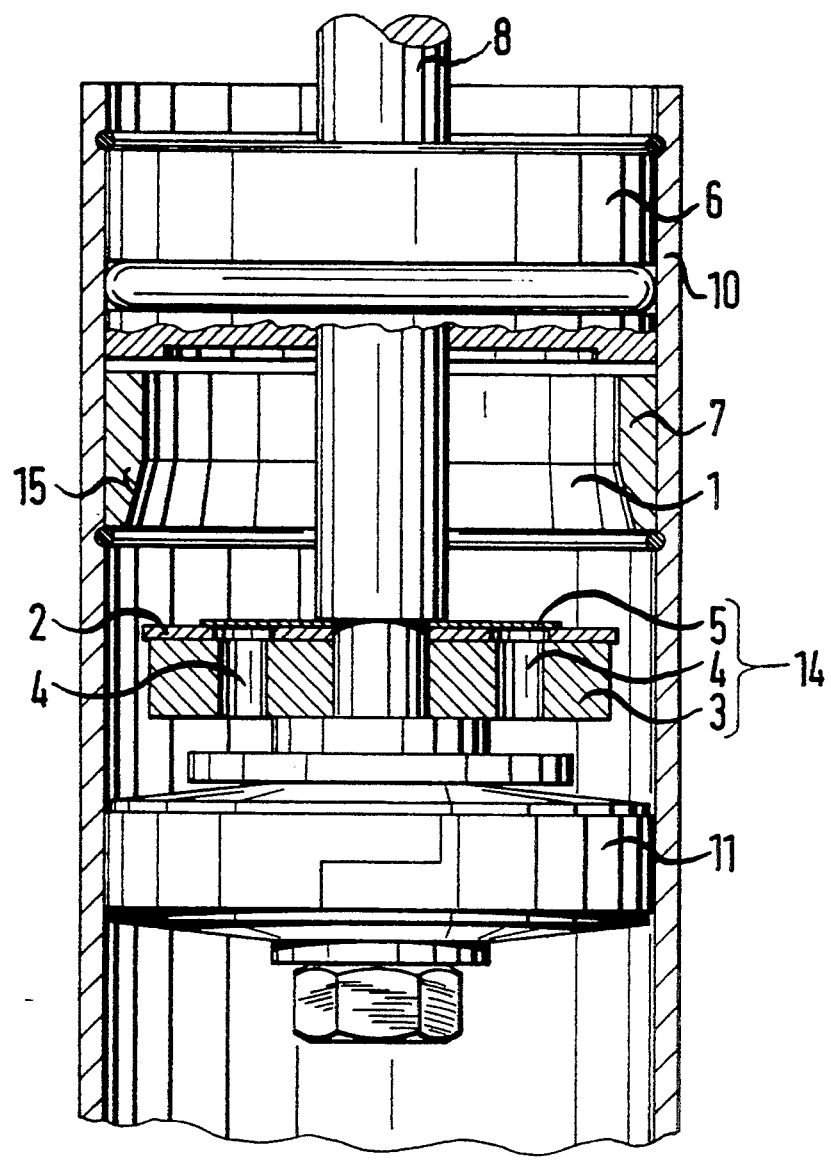
FIG. 2 is a section through a one-cylinder dashpot with a one-way valve on the stroke-limiting disk.
Figure 3B:
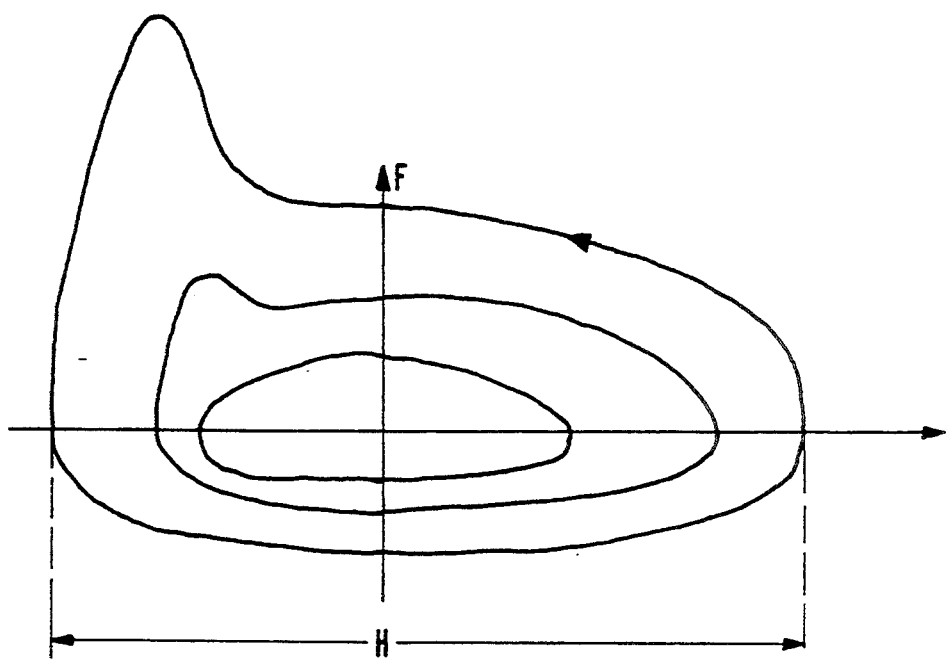
FIG. 3b is a graph of the attenuating force attained when the edge of the recess is beveled.

The one-cylinder dashpot illustrated in FIG. 2 consists essentially of a fluid-containing cylinder 10 and of a shock-absorbing piston 11 that travels in and out of it. A piston rod 8 extends from shock-absorbing piston 11 through a piston-rod centering component 6 in cylinder 10. Wheel spring-out is limited by a recess 1 in a tubular component 7 below piston-rod centering component 6. Mounted on piston rod 8 above shock-absorbing piston 11 is a stroke-limiting piston 14 comprising a disk 2 and its support 3. Channels 4 extend through stroke-limiting piston 14 and are blocked off in the decompression stroke direction by a spring-loaded disk 5 above stroke-limiting disk 2. The residual-oil gap is again demarcated while piston rod 8 is traveling out only by the edge of stroke-limiting disk 2 and by the inner surface of tubular component 7. An interior bevel 15 on the edge of tubular component 7 decelerates the engagement of attenuating force F dictated by the stroke limiter at the end of a stroke H as illustrated in FIG. 3b. Other configurations of the inner surface of tubular component 7 are also of course possible in order to attain a specific graph of attenuating force at the end of stroke H.

Another way of affecting the additional attenuating force generated by the decompression-stroke limiter is to provide at least two stroke-limiting disks 2, 2a each with similar channels 4 extending through them.

Figure 4:
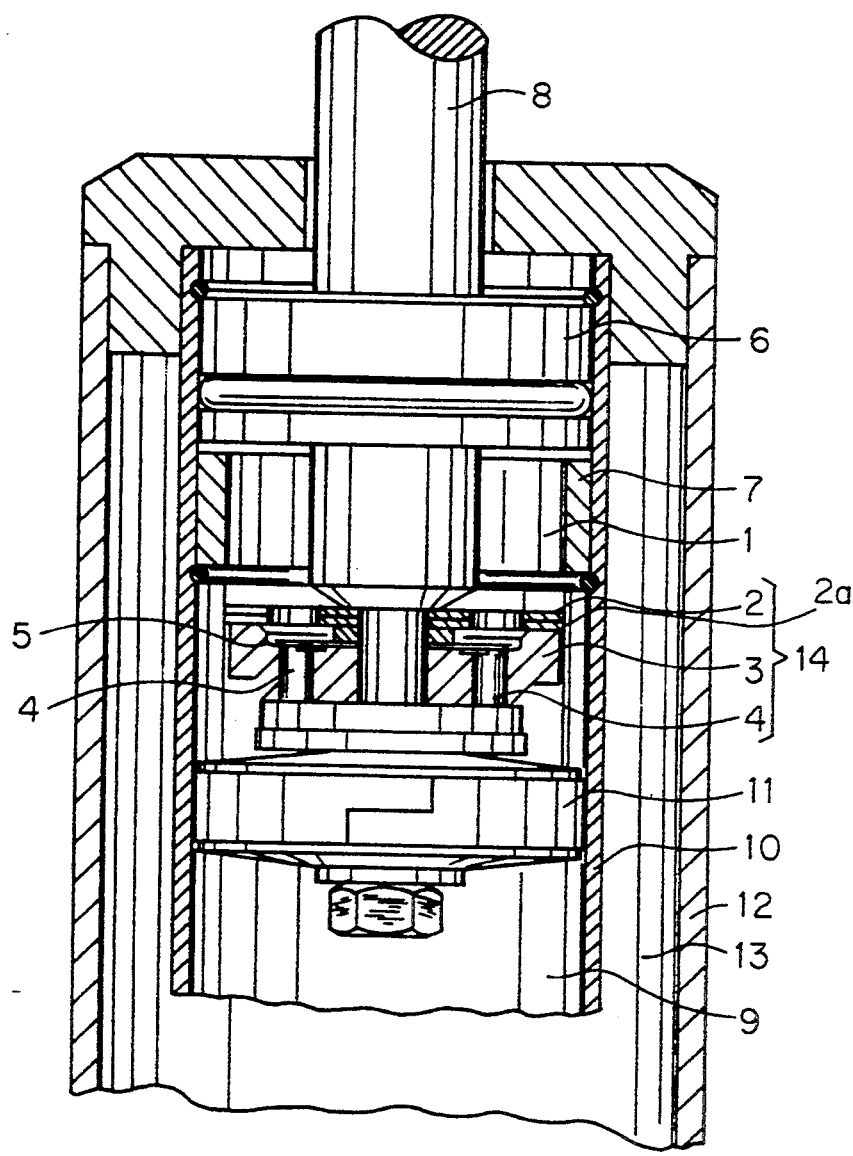
FIG. 4 is a sectional view of another embodiment of FIG. 1.
Figure 5:
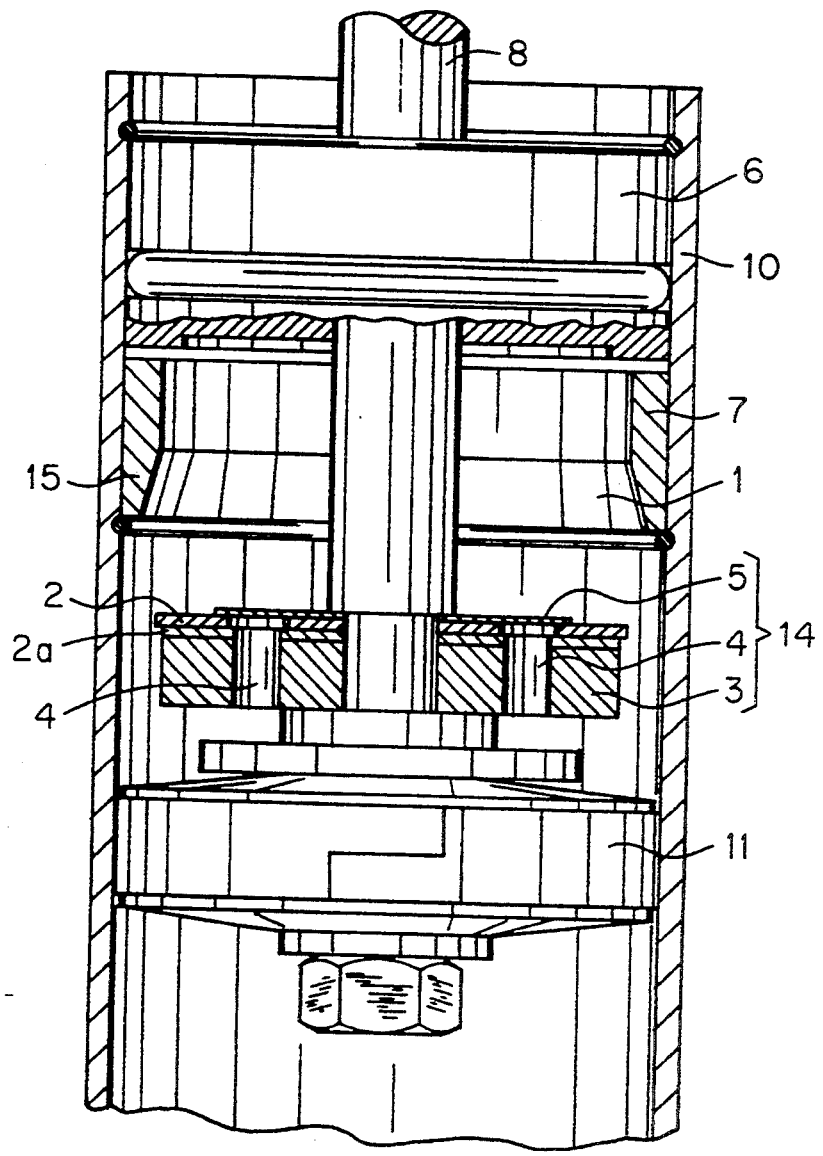
FIG. 5 is a sectional view of still a further embodiment of FIG. 1.

Thus, FIGS. 4 and 5 illustrate an arrangement whereby the damping force of the piston 14 is influenced by at least two disks 2, 2a with corresponding passages or channels 4 and a support 3.

The stroke-limiting disk of the present invention is not any kind of damping device on the stroke-limiting piston. Instead, this disk is a part of this stroke-limiting piston itself.

With the aid of the divided stroke-limiting piston it is necessary to maintain only high tolerances in the fabrication of the substantially thinner stroke-limiting disk. It is not necessary to maintain such high tolerances for the entire stroke-limiting piston. Accordingly, the fabrication of the piston is significantly simplified.

The stroke-limiting disks 2, 2a furthermore, may have equal or different diameters relative to each other. The disks 2 and 2a may also have equal thicknesses or their thicknesses may differ from one another.

What is claimed is:

1. A hydraulic dashpot for motor vehicles, comprising: a cylinder containing a fluid; a shock-absorbing piston traveling back and forth in said cylinder and dividing said cylinder into two displacement chambers; a piston rod connected to said piston and extending through a rod centering component at one end of said cylinder; a hydraulic decompression-stroke limiter having a cup-shaped recess below said centering component; a stroke-limiting piston on said piston rod above said shock-absorbing piston; said stroke-limiting piston having channels extending therethrough; means for blocking off said channels in a decompression-stroke direction; said stroke-limiting piston comprising a thin stroke-limiting disk having a diameter substantially shorter than a critical diameter of said recess and resting on a substantially thicker support, said support having a diameter substantially shorter than the diameter of said stroke-limiting disk; and a damping force through said piston rod becoming substantially large when said stroke limiting disk moves in said decompression-stroke direction and a distance between end points of the piston path increases, said means for blocking said channels being opened in a compression direction opposite to said decompression-stroke direction for reducing said damping force in said compression direction.

2. A hydraulic dashpot as defined in claim 1, including a tubular component mounted below said piston rod centering component on an inner wall of said cylinder, said recess being in said tubular component.

3. A hydraulic dashpot as defined in claim 2, wherein said tubular component has an inner surface adopted to a damping curve.

4. A hydraulic dashpot as defined in claim 2, wherein said tubular component has a beveled end facing said stroke-limiting piston.

5. A hydraulic dashpot as defined in claim 1, wherein said means for blocking off said channels comprises one-way valves in said decompression direction above said stroke-limiting disk.

6. A hydraulic dashpot as defined in claim 1, wherein said means for blocking off said channels comprises one-way valves with at least one spring-loaded disk for blocking off said channels in said decompression direction.

7. A hydraulic dashpot as defined in claim 1, wherein said stroke-limiting piston comprises at least two stroke-limiting disks with similar channels and a support for regulating a damping force.

8. A hydraulic dashpot for motor vehicles, comprising: a cylinder containing a fluid; a shock-absorbing piston traveling back and forth in said cylinder and dividing said cylinder into two displacement chambers; a piston rod connected to said piston and extending through a rod centering component at one end of said cylinder; a hydraulic decompression-stroke limiter having a cup-shaped recess below said centering component; a stroke-limiting piston on said piston rod above said shock-absorbing piston; said stroke-limiting piston having channels extending therethrough; means for blocking off said channels in a decompression-stroke direction; said stroke-limiting piston comprising a thin stroke-limiting disk having a diameter substantially shorter than a critical diameter of said recess and resting on a substantially thicker support; said means for blocking off said channels in said decompression direction comprising one-way valves between said support and said stroke-limiting disk.

9. A hydraulic dashpot for motor vehicles, comprising: a cylinder containing a fluid; a shock-absorbing piston traveling back and forth in said cylinder and dividing said cylinder into two displacement chambers; a piston rod connected to said piston and extending through a rod centering component at one end of said cylinder; a hydraulic decompression-stroke limiter having a cup-shaped recess below said centering component; a stroke-limiting piston on said piston rod above said shock-absorbing piston; said stroke-limiting piston having channels extending therethrough; means for blocking off said channels in a decompression-stroke direction; said stroke-limiting piston comprising a thin stroke-limiting disk having a diameter substantially shorter than a critical diameter of said recess and resting on a substantially thicker support; said support having a diameter substantially shorter than the diameter of said stroke-limiting disk; said means for blocking off said channels in said decompression direction comprising one-way valves between said support and said stroke-limiting disk; a tubular component mounted on said piston rod below said piston rod centering component, said recess being in said tubular component; said tubular component having an inner surface adapted to a damping curve; said tubular component having a beveled end facing said stroke-limiting piston; said stroke-limiting piston comprising at least two stroke-limiting disks with similar channels and a support for regulating a damping force.

* * * * *